Feb. 15, 1955     C. A. WOODWARD     2,702,359
RECTIFIER ASSEMBLY AND SPACER MEMBER FOR USE THEREIN
Filed Aug. 29, 1949
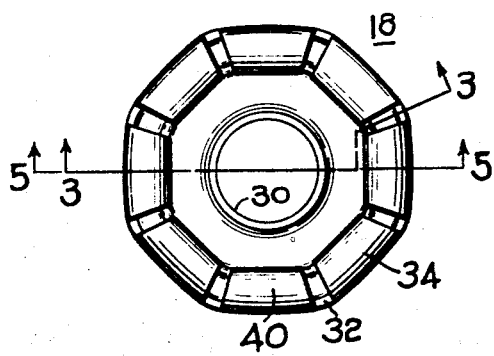
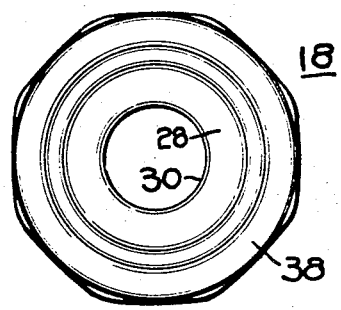
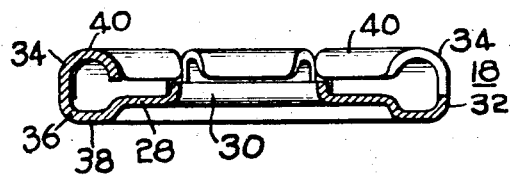
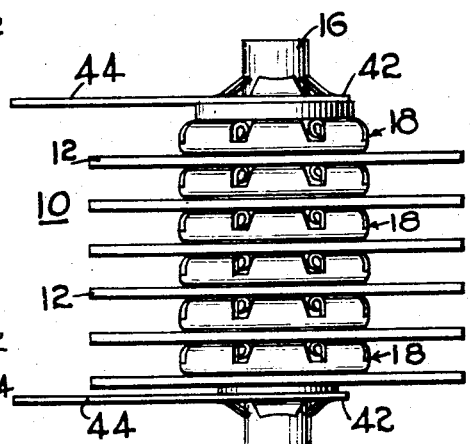
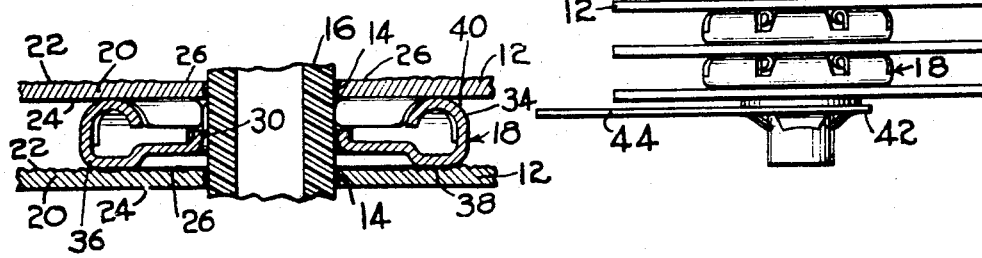
INVENTOR:
CLEMENT A. WOODWARD,
BY Philip E. Parker
ATTORNEY.

United States Patent Office 2,702,359
Patented Feb. 15, 1955

2,702,359

RECTIFIER ASSEMBLY AND SPACER MEMBER FOR USE THEREIN

Clement A. Woodward, Wellesley, Mass., assignor to United-Carr Fastener Corporation, Cambridge, Mass., a corporation of Massachusetts Application August 29, 1949, Serial No. 112,905

1 Claim. (Cl. 317—234)

This invention relates generally to dry plate current rectifier assemblies, and has particular reference to a spacer member for use in such rectifiers.

In the construction of dry plate rectifiers, such as the selenium type, individual rectifier plates having central openings are mounted in a stack on an insulating support rod disposed through the openings, with spacing washers interposed between each pair of adjacent plates. Means are provided on the rod beyond each outermost plate for retaining the plates compressed together on the rod. The individual plates of a rectifier of the selenium type comprise generally a base of sheet metal, which is coated with layers of various materials to provide the rectification action. One side of the plate is generally called the selenium side, since a layer of selenium is disposed thereon in conjunction with other layers, to provide the rectifying action, and the other side is sometimes called the base side. Since considerable heat is generated during operation of the rectifier, space must be provided between adjacent plates to allow an air circulation therebetween, and this is accomplished by the spacing washers. Since the washers also serve as electrical connectors between the adjacent plates, one of the washers between each pair of plates is usually constructed in the form of a convex disc, with radial slots forming resilient legs capable of being compressed when the plates are assembled, to provide good electrical contact between the plates and the washers.

Rectifier assemblies commonly used are subject to a number of disadvantages which increase the cost of the rectifier and shorten its life. Since the layers of material on the rectifier are extremely thin, any irregularity on the surface of the washer in contact with the selenium side of a plate will cause a high contact pressure at one point. Eventually the washer will cut through the layers at this point and come in contact with the metal base, thereby shorting the rectifier plate and destroying the rectifying action. This is most frequently caused by the legs of the resilient washer, since the legs frequently have sharp edges and are subject to a certain amount of movement in relation to the plates during assembly, which causes a scuffing action against the plates.

Since the resilient washers that have been used heretofore do not, by themselves, provide sufficient space between the plates to allow adequate dissipation of the heat generated in the plates, additional spacing members must be provided between each pair of plates. The use of two different types of spacing members between adjacent plates makes it impractical to assemble such rectifiers by automatic machinery. Instead, hand assembly must be used, which is a time-consuming operation that increases the cost of the rectifier.

The object of this invention is to provide an improved resilient spacing member for use in dry plate rectifiers, which is adapted for assembly between adjacent rectifier plates for electrical contact with both plates.

A further object of the invention is to provide a spacing member for assembly between adjacent plates of a selenium rectifier, which is provided with a broad flat surface for contact with the selenium side of an adjacent plate, and resilient means for contact with the base side of the other adjacent plate.

A still further object of the invention is to provide a spacing member for use between rectifier plates for contact with both plates, in which resilient means for contact with one plate is shaped and arranged so that flexing of the resilient means does not cause movement of the portion of the spacer in contact with the other plate.

Another object of the invention is to provide a dry plate rectifier assembly having a single resilient spacing member between adjacent plates, said spacer member being shaped and arranged to connect adjacent plates electrically without damaging layers of material of the rectifier plates.

Other objects of the invention will, in part, be obvious and will, in part, appear hereinafter.

For a fuller understanding of the nature and objects of the invention, reference should be had to the following detailed description, taken in conjunction with the accompanying drawing, in which:

Fig. 1 is a top plan view of a spacer member embodying the features of the invention;

Fig. 2 is a bottom plan view of the spacer member of Fig. 1;

Fig. 3 is a view in section of the spacer member taken on line 3—3 of Fig. 1;

Fig. 4 is a view in elevation of a selenium rectifier assembly embodying the features of the invention; and Fig. 5 is a view in section of the spacer member taken on line 5—5 of Fig. 1, assembled on an insulating support rod between a pair of rectifier plates.

Referring to the drawing, there is illustrated a selenium rectifier assembly 10, which comprises a plurality of rectifier plates 12 having openings 14 disposed centrally therein, an insulating support rod 16 assembled in the openings, and spacer members 18 interposed on the rod between adjacent plates 12. The individual plates 12 comprise a sheet metal base member 20, having various layers of material thereon to provide the required rectification of the current. The individual layers, not being a part of the present invention, are not shown, and are well known in the art, but each plate 12 is provided with the usual selenium side 22 and base side 24. For reasons of convenience in manufacture of the rectifier plates, a portion 26 of the selenium side immediately adjacent the opening 14 is not provided with rectifying layers. Since the appearance of the surface of the two sides of the finished plate is substantially identical, the uncoated portion 26 also serves to identify the selenium side during assembly of the rectifier.

The spacer members 18 each comprise a base 28 having an opening 30 therein for receiving the support rod 16, and an upwardly turned outer periphery 32 having a series of resilient contact arms 34 disposed thereon. A downwardly embossed portion 36 is provided on the base about the opening 30 in spaced relation thereto, and the embossed portion 36 has a relatively broad flat lower surface 38 for contact with the selenium side of an adjacent rectifier plate. The arms 34, in the preferred form, extend upwardly from the periphery 32, and are curled inwardly and downwardly to provide a rounded upper surface 40 for contact with the base side of an adjacent rectifier plate.

To assemble the rectifier, the plates 12 and the spacers 18 are assembled alternately on the rod 16, with the selenium side 22 of all the plates in the same direction, and the spacer members 18 so assembled between adjacent plates that the downwardly embossed portion 36 is in contact with the selenium side of an adjacent plate, and the upwardly extending arms 34 are in contact with the base side of the other adjacent plate. (See Fig. 5.) To retain the plates and spacers in assembly, a locking lug 42, having an extended arm 44 for making electrical connections to the rectifier, is mounted on each end of the rod 16 beyond each outermost rectifier plate. The lugs 42 and the plates are forced together under a predetermined controlled pressure, which causes downward flexing of the resilient contact arms 34. The locking lugs 42 then engage the rod 16 to retain the plates on the compressed condition.

As illustrated in Fig. 5, the downwardly embossed portion 36, being spaced apart from the opening 30, contacts the selenium side 22 of the adjacent lower plate beyond the uncoated portion 26, so that the relatively broad flat lower surface 38 provides a uniform low contact pressure against the selenium side 22. The edges of the surface 38, being formed by embossment of the base, are rounded, which prevents the occurrence of sharp corners which might protrude below the surface 38 and damage the layers on the selenium side of the plate.

The resilient contact arms 34, which flex downwardly when the plates are forced together, are able to move slightly inward in relation to the upper plate, by reason of the rounded upper surface 40. Since there are no rectifying layers on the base side 24 in contact with the arms, there is no danger of shorting the rectifier plate by such movement. The arms 34 are disposed on the upwardly turned outer periphery 32 of the base, and consequently flexing of the arms occurs only above the point at which the arms are joined to the periphery. By this construction, flexing of the arms during assembly does not cause movement of any portion of the base in contact with the selenium layer on the lower plate which would tend to damage the rectifying layers.

Although the spacer member is particularly adapted for use in selenium rectifiers, it is suitable for use with any variety of dry plate rectifier, or in any device requiring a resilient spacer member between plate members.

Since certain obvious changes may be made in the device, without departing from the scope of the invention, it is intended that all matter contained herein be interpreted in an illustrative and not in a limiting sense.

I claim:

A rectifier assembly, comprising a stack of similarly oriented rectifier plates having aligned openings therein, each plate having a rectifying side and a base side; an insulating support rod disposed through the openings; a spacer member disposed between adjacent pairs of rectifier plates, said spacer comprising a base having an opening therein receiving the support rod, a downwardly embossed portion disposed in the base about the opening in spaced relation thereto in electrical contact with the rectifying side of one adjacent plate, said downwardly embossed portion having a relatively broad flat lower surface providing low contact pressure against the rectifying side of said one adjacent plate, and a series of upwardly extending arms disposed on the base and extending into resilient contact with the base side of the other adjacent plate, said arms being shaped and arranged to be flexed downwardly when the plates are forced together during assembly; and means on the support rod beyond each outermost plate retaining the plates compressed together on the rod.

References Cited in the file of this patent

UNITED STATES PATENTS

| | | |
|---|---|---|
| 1,801,836 | Aumann | Apr. 21, 1931 |
| 2,114,898 | Dormay | Apr. 19, 1938 |
| 2,328,488 | Peters | Aug. 31, 1943 |